(12) United States Patent
Carmona et al.

(10) Patent No.: US 10,556,605 B2
(45) Date of Patent: Feb. 11, 2020

(54) RAILWAY GUIDE SYSTEM INCLUDING SENSORS FIXED TO A RAIL

(71) Applicant: Commissariat a l'energie atomique et aux energies alternatives, Paris (FR)

(72) Inventors: Mikael Carmona, Tencin (FR); Laurent Jouanet, Autrans (FR); Thierry Vicol, Paris (FR); Stephane Neveu, Houilles (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 44 days.

(21) Appl. No.: 15/828,991

(22) Filed: Dec. 1, 2017

(65) Prior Publication Data

US 2018/0154914 A1 Jun. 7, 2018

(30) Foreign Application Priority Data

Dec. 2, 2016 (FR) ...................... 16 61849

(51) Int. Cl.
*G01B 21/32* (2006.01)
*B61L 23/04* (2006.01)
(Continued)

(52) U.S. Cl.
CPC .............. *B61L 23/047* (2013.01); *E01B 5/02* (2013.01); *G01P 1/023* (2013.01)

(58) Field of Classification Search
CPC .... B61L 23/04; B61L 1/16; B61L 1/14; B61L 25/021; B61L 1/06; G01N 27/72;
(Continued)

(56) References Cited

U.S. PATENT DOCUMENTS

| | | | | |
|---|---|---|---|---|
| 3,812,345 A | * | 5/1974 | Stone | B61L 1/025 177/210 R |
| 5,462,244 A | * | 10/1995 | Van Der Hoek | B61L 1/06 246/122 R |
| 2016/0221591 A1 | * | 8/2016 | Kuehbandner | B61L 1/165 |

FOREIGN PATENT DOCUMENTS

| EP | 1 521 072 A1 | 4/2005 | |
|---|---|---|---|
| EP | 1521072 A1 * | 4/2005 | ............... B61L 1/06 |

(Continued)

OTHER PUBLICATIONS

Office Action dated May 11, 2018 in European Patent Application No. 17205021.3.
(Continued)

*Primary Examiner* — Brandi N Hopkins
(74) *Attorney, Agent, or Firm* — Oblon, McClelland, Maier & Neustadt, L.L.P.

(57) ABSTRACT

A guide system including a railway rail extending along an axis and including an upper element having a rolling face; a lower element having a bearing face; a connecting element between the lower and upper elements, at least one lateral recess being formed between the lower and upper elements; at least first and second attitude sensors fixed to the rail by glue at respective positions offset along the axis of the rail, the attitude sensors being housed at least partially in the lateral recess; a processing circuit configured to recover attitude measurements supplied by the first and second attitude sensors and configured to calculate a deformation of the railway rail relative to the axis as a function of the recovered attitude measurements.

9 Claims, 3 Drawing Sheets

(51) Int. Cl.
*E01B 35/08* (2006.01)
*E01B 5/02* (2006.01)
*G01P 1/02* (2006.01)

(58) Field of Classification Search
CPC .. H04Q 2209/84; H04Q 9/00; H04Q 2209/10;
G01B 5/28; G01B 21/30; G01B 5/25;
G01B 5/14; E01B 35/02; G01C 9/06
See application file for complete search history.

(56) References Cited

FOREIGN PATENT DOCUMENTS

| | | |
|---|---|---|
| EP | 2 862 778 A1 | 4/2015 |
| FR | 3 001 237 A1 | 7/2014 |
| FR | 3 012 478 A1 | 5/2015 |
| GB | 2 372 569 A | 8/2002 |
| WO | WO 2007/009132 A2 | 1/2007 |

OTHER PUBLICATIONS

French Preliminary Search Report dated Sep. 8, 2017 in French Application 16 61849, filed on Dec. 2, 2016 (with English Translation of Categories of cited documents & Written Opinion).

\* cited by examiner

RAILWAY GUIDE SYSTEM INCLUDING SENSORS FIXED TO A RAIL

FIELD OF THE INVENTION

The invention concerns the field of track geometry and more particularly the long base level parameter that characterizes vertical deformation of lengths of rail in the range of long wavelengths.

BACKGROUND OF THE INVENTION

The passage of high-speed trains necessitates very accurate track geometry. Track geometry has a direct impact on rail traffic. In fact, if the parameters that define the track are outside their nominal range train speeds must be reduced for reasons of safety and comfort, which can disturb all the traffic.

Monitoring rail track geometry for maintenance purposes thus proves indispensable to guaranteeing an optimum train speed. Any improvement in track geometry monitoring makes it possible to improve the management and maintenance of traffic on the rail network. Monitoring track geometry notably includes determining the signal of long base level and the long base straightness. Geometry monitoring of this kind proves particularly important in areas of fast change and areas of transition between ballast and a metal structure.

A known example of monitoring rail track geometry is employed on the French rail network using the IRIS320 high-speed train. This train travels over each of the high-speed lines every two weeks. This train carries out optical and inertial measurement of the track geometry on each of its passes.

The use of a train of this kind has a number of drawbacks. On the one hand, some track geometry parameters can change at a much higher frequency than that of the passage of the train. Thus the thermal expansion of a mixed steel-concrete structure, linked to temperature variations, notably induces relatively rapid track geometry variations. If this train measures a geometry variation that is out of range caused by a temporary factor, the speed of high-speed trains will have to be reduced although the track geometry is potentially satisfactory at the time of passage of high-speed trains operated commercially. As the passage of the IRIS320 train must interfere minimally with the operation of commercial trains, geometry monitoring during its passage is not necessarily representative of the geometry of the track during the passage of commercial trains. On the other hand, track geometry monitoring is not necessarily available in real time.

It is difficult to envisage significantly increasing the frequency of passages of monitoring trains of this kind given the cost of a geometry monitoring train of this kind and the impact that it can have on traffic.

BRIEF SUMMARY OF THE INVENTION

The invention aims to eliminate one or more of these drawbacks. The invention aims in particular to calculate precisely a global deformation of the rail at a relatively high frequency without degrading commercial traffic on high-speed tracks. The invention therefore relates to a guide system as defined in claim 1.

The invention also relates to the variants in the dependent claims. The person skilled in the art will understand that each of the features of the dependent variants can be independently combined with the features of claim 1 without this constituting an intermediate generalisation.

BRIEF DESCRIPTION OF THE SEVERAL VIEWS OF THE DRAWINGS

Other features and advantages of the invention will emerge clearly from the description thereof given hereinafter by way of nonlimiting illustration and with reference to the appended drawings, in which.

DETAILED DESCRIPTION OF THE INVENTION

The determination in accordance with the invention of the deformation of a guide rail addresses a certain number of constraints:

immunity to exterior meteorological conditions;
immunity to the high currents flowing through the rails;
immunity to high level of electromagnetic interference during the passage of a train;
absence of deterioration of the structural integrity of the rail;
resistance to the passage of a train and/or a track maintenance train;
not constituting an obstacle to the passage of a train and/or a track maintenance train.

Figure 1:
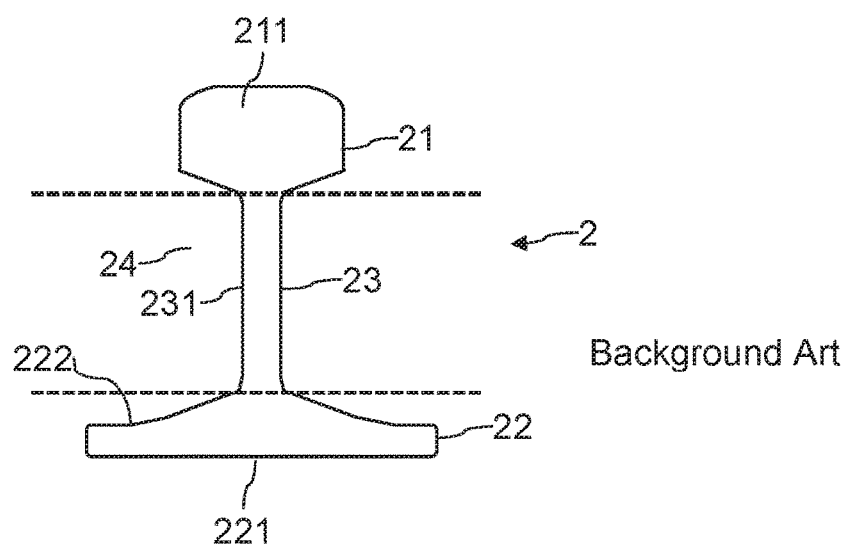
FIG. 1 is a diagrammatic view in cross section of one example of a railway rail.

FIG. 1 is a diagrammatic view in cross section of one example of a railway guide rail 2. In a manner known in itself a rail 2 of this kind is made of steel and is elongated along an axis. A rail 2 of this kind typically has an extruded shape or a very high radius of curvature. Here the rail 2 is divided into three distinct parts to favour understanding, these three parts being illustrated by elements separated by dashed lines in FIG. 1.

The guide rail 2 includes:

an upper element 21 (generally termed the head), having a substantially flat upper rolling face 211, a lower element 22 (generally termed the foot), having a lower face 221. The lower face 221 is intended to serve as a support face and/or a face for fixing to a support that is not shown, such as a sleeper, the lower element 22 also includes upper faces 222 oriented toward the upper element 21;

a connecting element 23 (generally termed the web) connecting the upper element 21 to the lower element 22. The width of the guide rail 2 is reduced at the level of the connecting element 23. The connecting element 23 includes substantially vertical faces 231. At least one lateral recess 24 is formed between the upper element 21 and the lower element 22 on one side of the connecting element 23. In the example shown, the guide rail 2 is substantially symmetrical and includes lateral recesses 24 between the elements 21 and 22 on each side of a vertical axis passing through the connecting element 23. The guide rail 2 therefore has a cross section having the overall shape of an I or the shape of two C's joined back-to-back. One example of a rail is notably standardized under the reference 60E1. A rail 2 typically has a length of several tens of metres, for example 100 metres.

Figure 2:
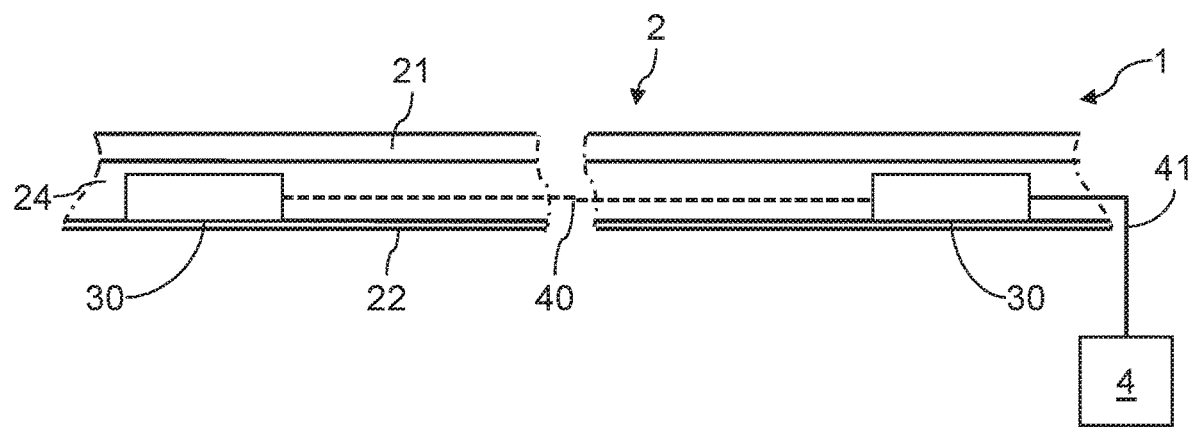
FIG. 2 is a side view of one example of a guide system according to one embodiment of the invention including a railway rail and a rail attitude determination device.

FIG. 2 is a side view of an example of a guide system 1 including a rail 2 and a rail attitude determination device. Here the attitude determination device includes in particular two attitude sensors 30 fixed to the rail 2 and offset along the longitudinal axis of the rail 2. The attitude sensors 30 are housed at least partially in a lateral recess 24 of the rail 2. This limits the lateral overall size of the sensors 30, which reduces the risk of contact with devices for maintaining the rail 2. The attitude sensors 30 are advantageously positioned in the recess oriented toward the median area between the two rails of the track, usually termed the inner face of the rail.

A processing circuit 4 is configured to recover attitude measurements supplied by the attitude sensors 30. The processing circuit 4 is configured to calculate a deformation of the rail 2 relative to its longitudinal axis. Here the processing circuit 4 is offset relative to the rail 2. The processing circuit 4 is for example implemented in the form of software executed on a computer. Here the processing circuit 4 is connected to the attitude sensor 30 via a wired connection 41 including power supply wiring and communication wiring. The attitude sensors, here the attitude sensors 30 in particular, are connected one after the other by a wired connection 40 including in particular power supply wiring and communication wiring.

Figure 3:
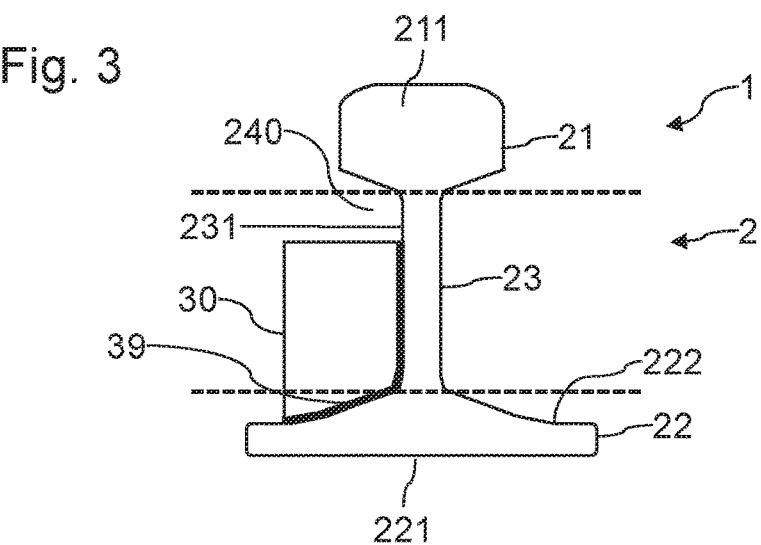
FIG. 3 is a view in cross section of the system at the level of an attitude sensor fixed to the rail.

FIG. 3 is a view in cross section of the guide system 1 at the level of an attitude sensor 30 fixed to the rail 2. The attitude sensor 30 is fixed to the rail 2 by means of a film of glue 39. In order to optimize the mechanical connection between the attitude sensor 30 and the rail 2 the film of glue 39 connects the attitude sensors 30 to both a face 222 of the lower element 22 and a face 231 of the connecting element 23. The attitude sensor 30 advantageously includes two faces espousing the shape of the faces 222 and 231 in order to favour its positioning relative to the rail 2 and the mechanical strength of the film of glue 39.

Fixing the attitude sensors 30 by means of a film of glue 39 makes it possible to avoid degrading the structural integrity of the rail and to guarantee excellent positioning of each attitude sensor 30 relative to the rail 2 despite the mechanical loads linked to the passage of trains or maintenance trains. A fixing of this kind makes it possible not to introduce uncertainties that could be linked to relative movement between an attitude sensor 30 and the rail 2.

An appropriate choice of the film of glue 39, i.e. choosing an electrically insulative glue, makes it possible to increase the dielectric strength between the rail 2 and the interior of the box 320 (described in detail hereinafter).

The film of glue 39 can for example employ Henkel's Loctite EA 9466 epoxy glue or 3M's DP8405NS epoxy glue. A glue of this kind is for example chosen for its properties of mechanical resistance to pulling off, peeling and shearing, electrical insulation, resistance to a large number of chemical products, long-term strength and resistance to vibrations. Pull-off and temperature resistance tests have demonstrated the satisfactory properties of the chosen films of glue 39. The film of glue 39 is advantageously applied after grinding and degreasing the surfaces 231 and 222.

Moreover, a gap 240 is formed in a lateral recess 24 between an upper face of the attitude sensor 30 and the upper element 21. This gap is intended to allow the passage of a rail maintenance device (for example a ballast tamping train) pinching the upper element 21 without risk of damaging the attitude sensor 30.

Figure 4:
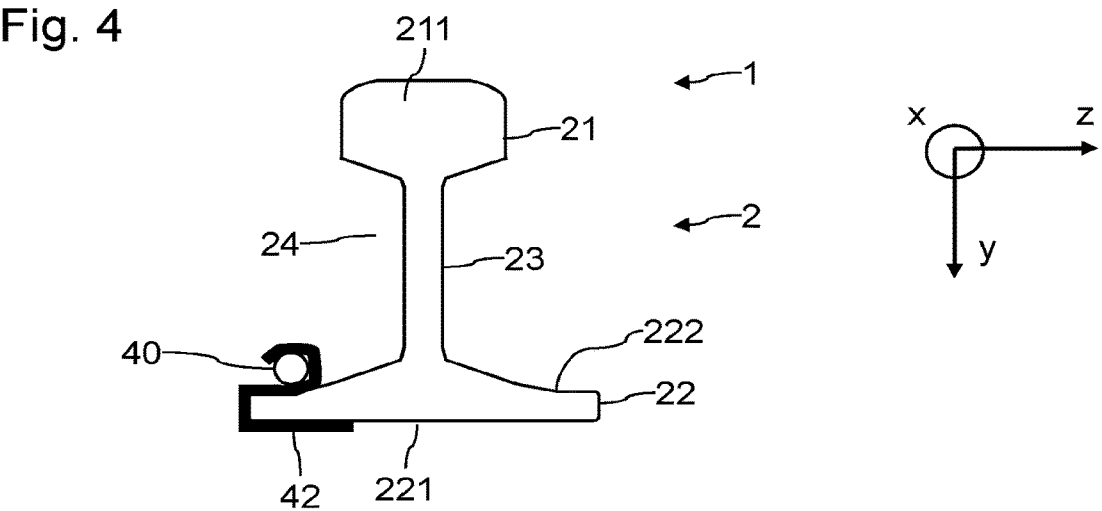
FIG. 4 is a view in cross section of the system at the level of a connecting cable between attitude sensors.

FIG. 4 is a view in cross section of the system 1 at the level of the fixing of a wired connection 40 to the rail 2. The wired connection 40 extends along a face 222 between two adjacent attitude sensors. The wired connection 40 is advantageously fixed to the lower element 22 by means of a clip 42 fastened to the lower element 22. To obtain optimum precision for the determination of the deformation of the rail adjacent attitude sensors are advantageously at most 5 metres apart, preferably at most 3 metres.

Figure 5:
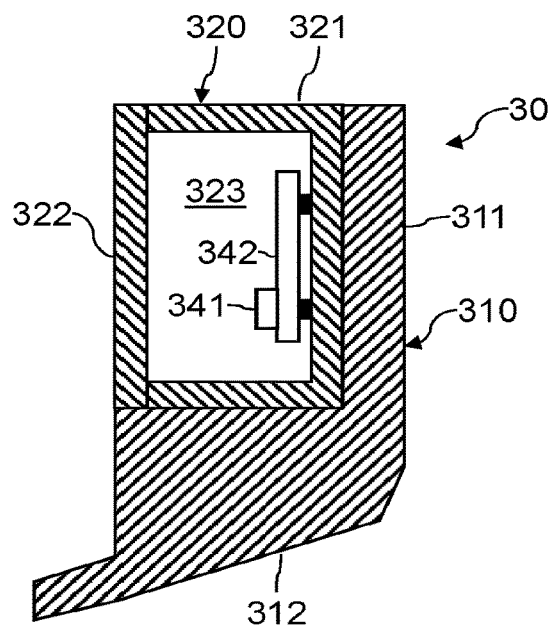
FIGS. 5 and 6 are views in cross section of an example of an attitude sensor.
Figure 6:
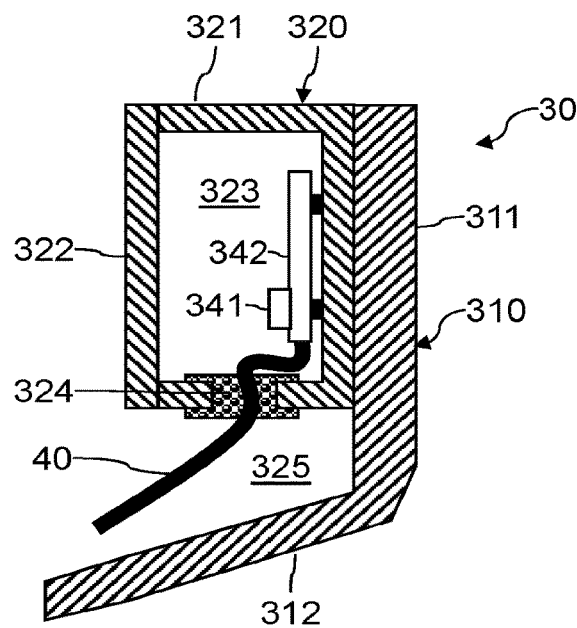

FIGS. 5 and 6 are views in cross section of an example of the structure of an attitude sensor 30 at two axially different locations. The attitude sensor 30 includes a support 310 intended to be glued to the rail 2. The support 310 therefore includes a face 311 intended to espouse a face 231 of the connecting element 23 and a face 312 intended to espouse a face 222 of the lower element 22. The support 310 is made of an electrically insulative material, for example PTFE. The support 310 therefore makes it possible to immunise the attitude sensor 30 against current loops flowing in the rail 2 during the passage of an overhead power line train.

The attitude sensor 30 further includes a box 320. The box 320 includes a shell 321 and a lid 322 defining a housing 323. The housing 323 is weatherproof to make it possible to carry out measurements under difficult climatic conditions, including temperature variations, the presence of moisture, wind and dust or rain or snow. The box 320 is fixed to the support 310 by any appropriate means, for example by gluing. The box 320 is advantageously configured to form a Faraday cage around the housing 323. The housing 323 is therefore protected from high levels of electromagnetic interference originating from power supplies or power transmission lines during the passage of a train. The box 320 (in particular its shell 321 and its cover 322) can for example be made from a plastic (for example PA) charged with metal particles or covered with metal walls for example produced by electroplating.

The attitude sensor 30 includes an electronic circuit 342 including processing means and an accelerometer 341 fixed for example to the substrate of the electronic circuit 342. The electronic circuit 342 and the accelerometer 341 are housed inside the housing 323. The electronic circuit and/or the accelerometer 341 can be coated in resin to improve their resistance to external attack. The coating material is for example polyurethane or epoxy and protects against chemical and physical-chemical attack and favours the absorption of possible impacts and stresses. The electronic circuit 342 can be glued to the box 320.

In the FIG. 5 sectional view the support 310 includes a solid shape supporting the box 320. In the FIG. 6 sectional view the support 310 is shown at the level of a recess 325 to allow the wired connection 40 to pass through. The box 320 includes two openings in a lower face. These openings lead into the recess 325 and wired connections 40 pass through them. The function of the wired connections 40 is to supply power to the electronic circuit 342 and the accelerometer 341 and to communicate with adjacent attitude sensors. Using wired connections 40 makes it possible to improve the immunity to electromagnetic interference of these communications. The electronic circuits 342 can be configured to relay a power supply to an adjacent attitude sensor. These openings are sealed by means of glands 324. These glands advantageously include screening so as not to degrade a Faraday cage formed by the box 320.

Each attitude sensor 30 will advantageously include a three-axis accelerometer 341. The accelerometer 341 can for example be Safran's MS9001 accelerometer. Each attitude sensor 30 can equally further include a temperature sensor and/or a multi-axis magnetometer.

The system 1 can for example be used to determine a long base level. The long base level corresponds to a (spatially) filtered version of the mean level defined as the mean level of each rail length of the track under study. The level of a rail length corresponds to the vertical deformation of that rail length. Consequently, the instrumentation of the two rail lengths that constitute a track by a system that measures the deformation of these rail lengths makes it possible to estimate the long base level.

The guide system 1 includes a plurality of attitude sensors 30 spaced from one another in the longitudinal direction of the rail 2. The attitude of a sensor is defined by the rotation that makes it possible to go from the system of axes of the sensor to a reference system of axes. The attitude can have three angles as parameters: inclination, roll and yaw. There are a number of ways to define these three angles. If the sensor 30 is fixed to the rail 2 so that one of its axes is parallel to the longitudinal axis of the rail 2 then:

the inclination angle of the sensor 30 corresponds to the angle of the rail 2 at the measurement point relative to a longitudinal axis of a fixed frame of reference;
the roll angle corresponds to the angle of rotation about the axis directed by the tangent to the rail 2;
the yaw angle corresponds to the angle of rotation about a vertical axis.

Here the system 1 includes in particular attitude sensors 30 distributed along the length of the rail 2. The attitude sensors 30 are fixed to the rail 2, which makes it possible to link their attitude to the deformation of the system 1. The instrumentation with the attitude sensors 30 according to the invention is typically intended to detect a deformation of 1 mm relative to the axes x, y and z over a 10 metre length of the rail 2.

Each attitude sensor 30 includes for example an accelerometer configured to measure in a manner known in itself at least one component of acceleration relative to the longitudinal axis of the rail 2 and an electronic circuit 342 configured to calculate the attitude of the sensor as a function of the measurement from its accelerometer 341.

The accelerometers 341 of the sensors 30 are MEMS devices for example. MEMS sensors of this kind have demonstrated their stability in terms of temperature and time and can at present have acceleration resolutions better than $0.1 \cdot 10^{-3}$ g.

As described in detail hereinafter, the processing circuit 4 recovers attitude measurements supplied by each attitude sensors 30 (for example raw measurement data from the attitude sensors) and calculates a deformation of the rail 2 as a function of these attitude measurements.

The processing circuit 4 is configured to recover the attitude measurements from the various attitude sensors, in particular the sensors 30. The processing circuit 4 is configured to calculate the global deformation or curvature of the rail 2 as a function of the various attitude measurements recovered. The processing circuit 4 can effect temporal filtering of the raw data supplied by the attitude sensors to improve the signal-to-noise ratio. Temporal filtering of this kind is justified by the hypothesis that a rail length is static over a window of a few minutes. A sampling frequency of 1 Hz can be envisaged for example.

Upon deformation of the rail 2 in bending or in torsion the attitude of the various attitude sensors is modified because of their mechanical coupling with the rail 2. The processing circuit 4 is programmed to evaluate the attitude at all points of the rail 2 from the measurements supplied by the attitude sensors. Evaluation of this kind is effected for example by means of interpolation methods such as cubic spline interpolation. Examples of interpolation and reconstruction methods are described for example in Chapter 1 of the doctoral thesis of N. Sprynski, "Reconstruction de courbes et surfaces à partir de données tangentielles" ["Reconstruction of curves and surfaces on the basis of tangential data"], Université Joseph Fourier, Grenoble, France, 2007.

Likewise, on deformation of the rail 2 in torsion the attitude of the various sensors is modified because of their mechanical coupling with the rail 2.

An example of calculating the deformation of the rail 2 from attitude/inclination measurements from the various attitude sensors may be as follows. It is assumed that the attitude sensors are 3-axis sensors effecting a measurement m(t,s) expressed in g where t is the measurement time and s is the curvilinear abscissa of a sensor along the rail 2. The inclination. φ(t,s) and the roll η(t,s) are those introduced above:

$$m(t, s) = \begin{bmatrix} \cos(\varphi(t, s)) \\ -\sin(\varphi(t, s)) * \sin(\eta(t, s)) \\ -\sin(\varphi(t, s)) * \cos(\eta(t, s)) \end{bmatrix}$$

The attitude sensors on the rail 2 with 3-axis accelerometers supply a spatial sampling of the inclination/attitude over the entire length equipped with these sensors as a function of the curvilinear abscissa along this rail 2. It is possible to extrapolate a continuous function representative of the inclination/attitude as a function of the curvilinear abscissa s along the rail 2 using an interpolation or approximation model based on discrete attitudes supplied by the attitude sensors fixed to the rail 2. The vertical deformation of the rail 2 at any point is defined using this function in the following equation:

$$Def(t, s) = \begin{bmatrix} x(t, s) \\ y(t, s) \end{bmatrix} = Def(t, s0) + \int_{u=s0}^{s} \begin{bmatrix} \cos(\varphi(t, u)) \\ \sin(\varphi(t, u)) \end{bmatrix} du$$

in the system of axes (O, $\vec{x}$, $\vec{y}$) where $\vec{y}$ is collinear with gravity and $\vec{x}$ is such that the plane (O, x, y) contains the curve representative of the rail.

Starting from the hypothesis that the point with curvilinear abscissa s0 remains fixed in time, then Def(t,s0)=0. The global deformation is then determined entirely by means of the continuous inclination function.

The precision of the calculation of the global deformation of the rail 2 depends in particular on the following parameters of the attitude sensor:

its technology, influencing the following parameters: its attitude sensor resolution (lowest acceleration that can be detected), its measurement noise standard deviation (linked to the resolution in some technologies), its temperature stability (drift in mg/° K) and its stability over time (drift in mg/year). The concept of stability over time integrates the sensitivity and calibration drifts of the sensor but also the drifts of the angles between each measurement axis for a 3-axis accelerometer that consists of three mutually perpendicular single-axis accelerometers;

the density and the spatial distribution of the attitude sensors along the rail 2. The higher the number of measurement nodes and the better their distribution, the more precise the reconstruction. For a rail 2 of substantially homogeneous geometric structure over its length a distribution of the attitude sensors that is uniform along its longitudinal axis is the optimum. For a structure of this kind, with the attitude sensors tested, three attitude sensors per 10 metres length of rail proves sufficient and a sensor every metre is the optimum;

uncertainties as to the mounting of the attitude sensors. A 3-axis accelerometer makes it possible to estimate the inclination of its own system of axes to the orientation direction of the rail 2. The more tangential the axis of the system of axes that defines the inclination of each accelerometer of an attitude sensor to the global deformation to be calculated, the more precise the global deformation calculated;

uncertainties as to the curvilinear abscissae of the attitude sensors. The uncertainty as to the abscissa of an attitude sensor influences reconstruction performance;

the interpolation/approximation model of the continuous inclination/attitude function. For a rail 2 the neutral fibre of which is substantially rectilinear, the inclination function is smooth and can be approximated by means of a cubic spline. Other interpolation models for defining an inclination function on the basis of local measurements are known to the person skilled in the art.

With the system 1 according to the invention the geometry of the rail 2 can be monitored at a relatively high frequency, for example every 15 minutes, or even every minute, without affecting rail traffic on the tracks. With a temporal frequency of this kind it is in particular possible to minimise the period for which rail traffic speed is reduced because the long base level exceeds a certain threshold.

A step of calibration of the system 1 can be effected. To this end a reference mobile attitude sensor can travel along the rail 2 for example. The measurements from this reference attitude sensor make it possible for example to align the system of axes of each attitude sensor fixed to the rail 2 as a function of the measurements effected by the mobile attitude sensor. The calibration can also include the precise location of the various attitude sensors 30 along the longitudinal axis of the rail 2.

The invention proves particularly advantageous for a transition area between ballast and a structure, particularly if subject to mechanical loads.

Figure 7:
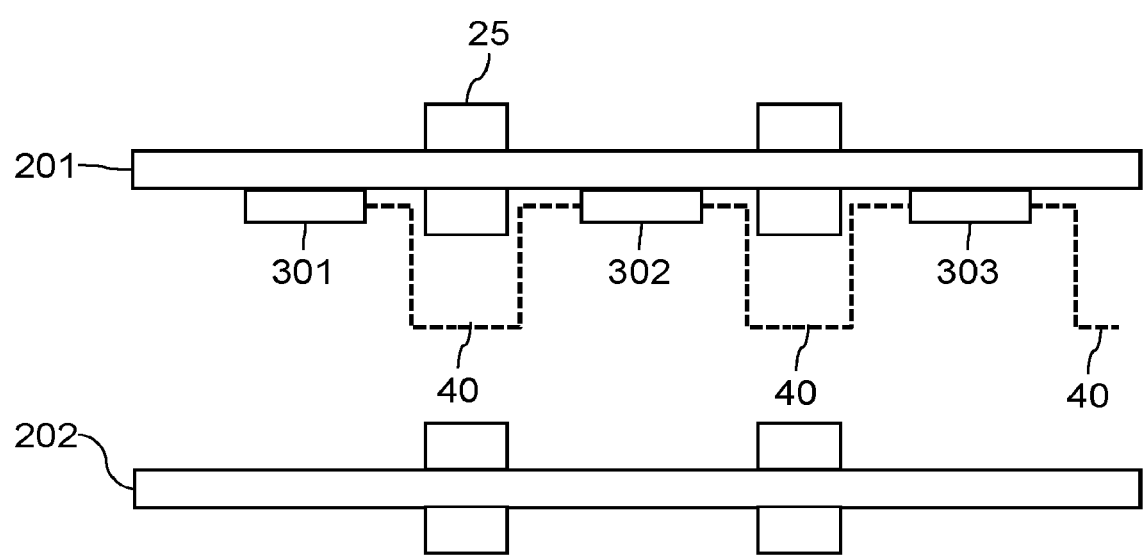
FIG. 7 is a plan view of an example of the configuration at the level of an expansion device.

FIG. 7 moreover shows a diagrammatic plan view of a particular application to an expansion half-device at one end of a transition area. The expansion half-device includes two parallel rails 201 and 202. Only the attitude sensors 301 to 303 of the rail 201 have been shown. The rails 201 and 202 are fixed to sleepers by chairs 25. These chairs 25 impede the passage of the wired connections 40. Consequently, a portion of the wired connections 40 is offset toward the median area between the rails 201 and 202 at the level of each chair 25.

The invention claimed is:

1. A guide system, comprising:
   a railway rail extending along an axis and further comprising:
   an upper element having a rolling face;
   a lower element having an upper face;
   a connecting element between the lower and upper elements, at least one lateral recess being formed between the lower and upper elements to a side of the connecting element;
   at least a first attitude sensor and a second attitude sensor are fixed to the rail by glue at respective positions offset along said axis of the rail, said attitude sensors being housed at least partially in the lateral recess; and
   a processing circuit configured to recover attitude measurements supplied by the first and second attitude sensors and configured to calculate deformation of said railway rail relative to said axis as a function of the recovered attitude measurements, wherein
   each of said first and second attitude sensors comprises
   an accelerometer configured to measure a component of acceleration along said axis, and
   an electronic circuit configured to calculate the attitude of the sensor as a function of the measurement from the accelerometer.

2. The guide system according to claim 1, wherein each of said first attitude sensor and said second attitude sensor comprises:
   an insulative material support glued to the rail;
   a box fixed to the support and forming a Faraday cage, said box housing at least one accelerometer of the respective attitude sensor.

3. The guide system according to claim 2, wherein the box is made of plastic charged with metal particles or plastic coated with a metal wall.

4. The guide system according to claim 2, wherein the support comprises a bottom face and a lateral face corresponding to shapes of respective faces of the lower element and the connecting element, the support resting entirely on the bottom face.

5. The guide system according to claim 1, wherein said respective accelerometers of the first and second attitude sensors are accelerometers with three non-colinear measuring axes.

6. The guide system according to claim 1, wherein said first and second attitude sensors are glued to the connecting element and to the lower element.

7. The guide system according to claim 1, wherein said first and second attitude sensors are spaced by a distance at most equal to 5 meters along the axis of the rail.

8. The guide system according to claim 1, further comprising a wired connection between the first and second attitude sensors, said wired connection being fixed to the lower element of the rail with a clip.

9. The guide system according to claim 1, wherein a gap is formed in a recess between an upper face of the first and second attitude sensors and the upper element.

* * * * *